US011790442B2

(12) United States Patent
Annunziata (10) Patent No.: US 11,790,442 B2
(45) Date of Patent: *Oct. 17, 2023

(54) SYSTEM AND METHOD FOR TRADING COMMODITIES AND THE LIKE

(71) Applicant: TRADECAPTURE OTC CORP., Stamford, CT (US)

(72) Inventor: Vincent P. Annunziata, Greenwich, CT (US)

(73) Assignee: Tradecapture OTC Corp., Stamford, CT (US)

( * ) Notice: Subject to any disclaimer, the term of this patent is extended or adjusted under 35 U.S.C. 154(b) by 327 days.

This patent is subject to a terminal disclaimer.

(21) Appl. No.: 13/875,723

(22) Filed: May 2, 2013

(65) Prior Publication Data

US 2013/0246246 A1   Sep. 19, 2013

Related U.S. Application Data

(62) Division of application No. 09/764,574, filed on Jan. 18, 2001.

(Continued)

(51) Int. Cl.
*G06Q 40/04* (2012.01)
*G06Q 30/0601* (2023.01)
(Continued)

(52) U.S. Cl.
CPC ......... *G06Q 40/04* (2013.01); *G06F 21/6254* (2013.01); *G06Q 30/0601* (2013.01);
(Continued)

(58) Field of Classification Search
CPC ........ G06Q 40/00; G06Q 40/02; G06Q 40/04; G06Q 40/06
(Continued)

(56) References Cited

U.S. PATENT DOCUMENTS

| 3,573,747 A | 4/1971 | Adams et al. |
| 4,264,782 A | 4/1981 | Konheim |

(Continued)

FOREIGN PATENT DOCUMENTS

| EP | 399850 B1 | 12/1995 |
| GB | 2358768 | 12/2001 |

(Continued)

OTHER PUBLICATIONS

Olsen et al., Market Design and HUman Trading Behavior, IEE Transactions 1999.*

(Continued)

*Primary Examiner* — Richard C Weisberger
(74) *Attorney, Agent, or Firm* — DLA Piper LLP (US)

(57) ABSTRACT

A system for trading commodities and the like comprising a computer, a communications link between the computer and the Internet, a database, accessible by the computer, containing a plurality of user files wherein each of the user files contains a plurality of transaction parameters corresponding to one or more indications associated with the user file. The transaction parameters govern the presentation and acceptance of indications associated therewith. The system further includes a database, accessible by the computer, containing a plurality of indications wherein each of the indications contains information corresponding to open bids or offers for commodities, and an indication selection submitted by a user over the communications link. Software executing on the computer receives the indication selection, retrieves an indication corresponding to the indication selection from the indication database, queries a user file in the user database corresponding to the indication to determine transaction parameters associated with the indication, and presents the indication to the user in accordance with any determined transaction parameters.

21 Claims, 7 Drawing Sheets

Related U.S. Application Data (60) Provisional application No. 60/177,275, filed on Jan. 21, 2000.

(51) Int. Cl.
  *G06Q 40/00* (2023.01)
  *G06Q 40/06* (2012.01)
  *G06Q 50/02* (2012.01)
  *G06F 21/62* (2013.01)

(52) U.S. Cl.
  CPC .............. *G06Q 40/00* (2013.01); *G06Q 40/06* (2013.01); *G06Q 50/02* (2013.01)

(58) Field of Classification Search
  USPC ..................................................... 705/35, 37
  See application file for complete search history.

(56) References Cited

U.S. PATENT DOCUMENTS

| | | | |
|---|---|---|---|
| 4,266,775 A | 5/1981 | Chitnis et al. | |
| 4,412,287 A | 10/1983 | Braddock, III | |
| 4,538,816 A | 9/1985 | Figueroa | |
| 4,677,552 A | 6/1987 | Sibley, Jr. | |
| 4,903,201 A * | 2/1990 | Wagner | |
| 5,077,665 A | 12/1991 | Silverman et al. | |
| 5,136,501 A | 8/1992 | Silverman et al. | |
| 5,168,446 A | 12/1992 | Wiseman | |
| 5,297,032 A | 3/1994 | Trojan et al. | |
| 5,715,402 A | 2/1998 | Popolo | |
| 5,727,165 A * | 3/1998 | Ordish .................. | G06Q 40/04 705/37 |
| 5,873,071 A | 2/1999 | Ferstenberg et al. | |
| 5,924,082 A * | 7/1999 | Silverman .............. | G06Q 40/00 705/35 |
| 5,970,479 A | 10/1999 | Shepherd | |
| 6,029,146 A | 2/2000 | Hawkins et al. | |
| 6,134,535 A | 10/2000 | Belzberg | |
| 6,161,099 A | 12/2000 | Harrington et al. | |
| 6,195,647 B1 | 2/2001 | Martyn et al. | |
| 6,272,474 B1 | 8/2001 | Garcia | |
| 6,278,982 B1 | 8/2001 | Korhammer et al. | |
| 6,282,521 B1 | 8/2001 | Howorka | |
| 6,304,858 B1 | 10/2001 | Mosler et al. | |
| 6,317,727 B1 | 11/2001 | May | |
| 6,317,728 B1 | 11/2001 | Kane | |
| 6,418,419 B1 | 7/2002 | Nieboer et al. | |
| 6,493,683 B1 | 12/2002 | David et al. | |
| 6,601,044 B1 | 7/2003 | Wallman | |
| 6,625,583 B1 | 9/2003 | Silverman et al. | |
| 6,647,373 B1 | 11/2003 | Carlton-Foss | |
| 6,766,304 B2 | 7/2004 | Kemp, II et al. | |
| 6,772,132 B1 | 8/2004 | Kemp, II et al. | |
| 6,938,011 B1 | 8/2005 | Kemp, II et al. | |
| 6,985,883 B1 | 1/2006 | Togher et al. | |
| 6,993,504 B1 | 1/2006 | Friesen et al. | |
| 6,995,540 B2 * | 2/2006 | Maruyama et al. | |
| 7,107,240 B1 | 9/2006 | Silverman et al. | |
| 7,177,833 B1 | 2/2007 | Marynowski et al. | |
| 7,181,424 B1 | 2/2007 | Ketchum et al. | |
| 7,184,984 B2 | 2/2007 | Glodjo et al. | |
| 7,194,468 B1 | 3/2007 | Bacila et al. | |
| 7,212,994 B2 | 5/2007 | Howell et al. | |
| 7,251,629 B1 | 7/2007 | Marynowski et al. | |
| 7,389,258 B2 | 6/2008 | Brumfield et al. | |
| 7,389,268 B1 | 6/2008 | Kemp, II et al. | |
| 7,424,303 B2 | 9/2008 | Al-Sarawi | |
| 7,424,452 B2 | 9/2008 | Feilbogen et al. | |
| 7,426,491 B1 | 9/2008 | Singer et al. | |
| 7,516,196 B1 | 4/2009 | Madan et al. | |
| 7,533,052 B2 | 5/2009 | Tilfors et al. | |
| 7,610,239 B1 | 10/2009 | Silverman et al. | |
| 7,617,149 B2 | 11/2009 | Rosenthal et al. | |
| 7,624,064 B2 | 11/2009 | Rosenthal et al. | |
| 7,624,066 B2 | 11/2009 | Janowski et al. | |
| 7,627,517 B2 | 12/2009 | Badenhorst et al. | |
| 7,685,048 B1 * | 3/2010 | Hausman et al. | |
| 7,778,919 B2 | 8/2010 | Waelbroeck et al. | |
| 8,751,362 B1 * | 6/2014 | Lutnick .................. | G06Q 40/04 705/37 |
| 2001/0034688 A1 | 10/2001 | Annunziata | |
| 2001/0049651 A1 | 12/2001 | Selleck | |
| 2002/0004774 A1 | 1/2002 | Defarlo | |
| 2002/0026403 A1 | 2/2002 | Tambay et al. | |
| 2002/0032632 A1 | 3/2002 | Sernet | |
| 2002/0069156 A1 | 6/2002 | Adam et al. | |
| 2002/0091615 A1 | 7/2002 | Salvani | |
| 2002/0120555 A1 | 8/2002 | Lerner | |
| 2002/0138390 A1 | 9/2002 | May | |
| 2002/0169703 A1 | 11/2002 | Lutnick et al. | |
| 2002/0188555 A1 | 12/2002 | Lawrence | |
| 2003/0004859 A1 * | 1/2003 | Shaw ..................... | G06Q 40/04 705/37 |
| 2003/0018569 A1 | 1/2003 | Eisenthal et al. | |
| 2004/0199453 A1 | 10/2004 | Brady et al. | |
| 2005/0021445 A1 * | 1/2005 | Caro ...................... | G06Q 10/107 705/37 |
| 2005/0160024 A1 | 7/2005 | Soderborg et al. | |
| 2006/0069635 A1 | 3/2006 | Ram et al. | |
| 2006/0085310 A1 | 4/2006 | Mylet et al. | |
| 2006/0184444 A1 | 8/2006 | McConaughy et al. | |
| 2006/0253371 A1 | 11/2006 | Rutt et al. | |
| 2006/0282369 A1 | 12/2006 | White | |
| 2007/0083458 A1 | 4/2007 | Rosenthal et al. | |
| 2007/0088658 A1 | 4/2007 | Rosenthal et al. | |
| 2007/0118456 A1 | 5/2007 | Glinberg et al. | |
| 2007/0168275 A1 | 7/2007 | Busby et al. | |
| 2008/0059353 A1 | 3/2008 | Ronk | |
| 2008/0097892 A1 | 4/2008 | Yohai-Giochais | |
| 2008/0109379 A1 | 5/2008 | Cofnas et al. | |
| 2009/0171832 A1 | 7/2009 | Busby | |
| 2010/0010937 A1 | 1/2010 | Rosenthal | |
| 2010/0057626 A1 | 3/2010 | Lutnick et al. | |
| 2011/0112952 A1 | 5/2011 | Annunziata et al. | |

FOREIGN PATENT DOCUMENTS

| | | | | |
|---|---|---|---|---|
| WO | WO1999019821 | * | 12/1999 | ............. G06Q 40/04 |
| WO | WO-2007041220 A2 | * | 4/2007 | ............. G06Q 30/08 |

OTHER PUBLICATIONS

2005 Energy Transaction Software Companies . Electric Light and Power 2005.*
Breaking Instinet in two, Jan. 2004, Markets Media Group.*
Ioi comes of age, traders magazine 2008.*
Breaking Instinet in Two , Jan. 2004.*
White, PCT/US98/17472 (Year: 1998).*
Lux, Hal, "Amex Specialists Send Pledge in Unusual Pitch to Brokers," The Investment Dealers' Digest: IID, Proquest, No. 1993.
TradeCapture, "TCTS Symphony:" http://www.tradecapture.com/products/pro_symphony.html (viewed Oct. 2005).
TradeCapture, "About TradeCapture:" http://www.tradecapture.com/company/cmpny_about.html (view Oct. 2005).
"Marketing Strategies Industry News," National Petroleum News, Apr. 2000, vol. 92, Issue 4, p. 64.
Annunziata, Vincent P., "*Counterparty Credit Risk Issues,*" Futures, Cover Story Markets, Oct. 2002.
Bisset, Susan, "*Trading with a Network,*" Futures 101, 2002.
Ecommerce, "*Energy Trading Firms Form Exchange,*" Chemical Week, Oct. 2000.
10k Wizard Sec Power Search, Form 10-K Investment Technology Group Inc—ITG, Annual Report, Dec. 31, 2001, 70 pages.

* cited by examiner

SYSTEM AND METHOD FOR TRADING COMMODITIES AND THE LIKE

FIELD OF THE INVENTION

The invention relates to a system for trading commodities and the like over the Internet.

BACKGROUND OF THE INVENTION

The commodities market is a constantly evolving market covering a wide variety of tradeable goods. There are three basic segments of the commodities market: agricultural, natural resources, and financial instruments. The agricultural segment is a broad segment covering everything from grains, such as corn and wheat, to oils and meal, such as soybeans and sunflower seed oil, to livestock such as live cattle and pork bellies. The agricultural segment also includes forest products, such as lumber and plywood, textiles such as cotton, and foodstuffs such as coffee and sugar. The natural resources segment covers metals and petroleum, such as gold, copper, crude oil and natural gas. The financial instruments segment is another broad market covering everything from interest bearing assets, such as government treasury bills to municipal bonds, to foreign currencies, such as the yen and Euro, to futures on most major indexes, such as the S&P 500 and New York Stock Exchange Composite. For each of these commodities there are different contract months, grades, amounts, and types available for trading and the available commodities and contracts expands on nearly a daily basis.

Trading in such over-the-counter ("OTC") commodities markets generally involves commodity traders and commodity brokers placing bids to buy physical commodities or derivatives, consisting of contracts known in the commodities industry as 'swaps' and "options", the value of which are based upon the fluctuating prices of one or more underlying commodities that are the subject of such contract, and offers to sell commodities and derivatives, in the various forms. Such bids and offers are often designated as firm or non-firm. Firm bids and offers are generally non-negotiable while non-firm bids may be negotiable. Trading of exchange traded futures and options are also extremely active in the commodities industry.

There has been an increasing desire in the various commodities markets to move toward Internet-based system to cultivate the vast capabilities and possibilities of the Internet in order to attract new clientele and to expedite and process transactions between parties. Currently, OTC physicals and derivatives are traded dominantly via a phone based system of Party A calling Party B. Regulated futures contracts have been trading via a "pit" and electronic "non-internet" basis. However, the actual trading of the OTC physical and derivative commodities is generally left to brokers and traders using relatively traditional means of telephone, fax, and telex. In this regard, various industry entities comprised of commodity traders, commodity brokers, and combinations thereof, have been forming groups to study the use of the Internet as a tool to "pool order liquidity" and "streamline transactions and workflow". However, a major problem occurs when multiple groups form as liquidity is thus divided up or spread out amongst the groups. Certain groups may have dominant liquidity in commodities specific to that group. However, commodities that are common to various groups have liquidity drained by splitting the liquid pool provided by users amongst the multiple groups.

What is desired, therefore, is system for trading commodities and the like in an Internet-driven environment, such as designated web sites for each group, that permit member traders and brokers of the groups to post and view bids and offers on commodities specific to that group as well as common commodities and negotiate and consummate transactions based on the bids and offers across the various groups, thereby pooling liquidity and truly streamlining transactions and improving workflow between the various entities.

SUMMARY OF THE INVENTION

Accordingly, it is an object of the invention to provide a system for facilitating commodity transactions.

Another object of the present invention is to provide a system that permits the user to control how any bids or offers submitted are acted upon and viewed by other users.

Yet another object of the present invention is to provide such a system that permits users to operate within specific exchanges having specific commodities.

It is a further object of the present invention to provide such a system that enables various exchanges to create and share commodities within a unified database.

It is another object of the present invention to provide such a system that permits the user to rapidly peruse a variety of available transactions.

It is yet another object of the present invention to provide such a system that operates over the Internet.

Another object of the present invention to provide such a system that can permit a user to quickly review the user's current position.

These and other objects of the invention are accomplished by the provision of a system for trading commodities and the like. The system comprising a computer, a communications link between the computer and the Internet, a database, accessible by the computer, containing a plurality of user files wherein each of the user files contains a plurality of transaction parameters corresponding to one or more indications associated with the user file. The transaction parameters govern the presentation and acceptance of indications associated therewith. The system further includes a database, accessible by the computer, containing a plurality of indications wherein each of the indications contains information corresponding to an open bid or offer for a specified commodities, and an indication selection submitted by a user over the communications link. Software executing on the computer receives the indication selection, retrieves an indication corresponding to the indication selection from the indication database, queries a user file in the user database corresponding to the indication to determine transaction parameters associated with the indication, and presents the indication to the user in accordance with any determined transaction parameters.

The user files may further containing exchange permissions corresponding to exchanges to which the user may access and al least one computerized exchange for transacting specified commodities accessible by selected users having proper exchange permissions for each exchange. Software executing on said computer queries the user database to retrieve exchange permissions from a user file corresponding to the user, retrieves indications from the indication database corresponding to the predetermined, commodities within the exchanges to which the user has been determined to have access and generating a presentation of the retrieved indications.

Preferably, the system permits a submitter of an indication to remain anonymous or reveal certain information to other users of the system and grant preferred status to particular predetermined users by way of transaction parameters. The system preferably also includes software executing on the computer for transmitting a plurality of formatting, sorting and content options to the user over said communications link and formatting the plurality of bids and offers according to selections submitted by the user prior to transmitting the plurality of bids and offers to the user. The system may further include software executing on the computer for transmitting an offer form to the user over said communications link in order to create new bids and offers to add to the bid and offer database upon receipt of completed offer forms submitted by users.

The system may further include software executing on said computer for retrieving information necessary to finalize an acceptance of a firm bid or offer from the bid and offer database corresponding to a bid or offer selection, and finalizing said transaction. The system may also include software executing on said computer for facilitating non-firm bids and offers by providing users with contact information corresponding to said selection from said bid and offer database in order to permit the user to communicate with the original submitter of the non-firm bid or offer selected by the user to complete the transaction. Such communication may also involve a negotiation regarding the selected non-firm bid or offer. Preferably, software executing on the computer also tracks the activities of users and stores the tracked activities of each user in their respective user files for later perusal by users and/or administrators.

The invention and its particular features and advantages will become more apparent from the following detailed description considered with reference to the accompanying drawings.

DETAILED DESCRIPTION OF THE DRAWINGS

Figure 1:
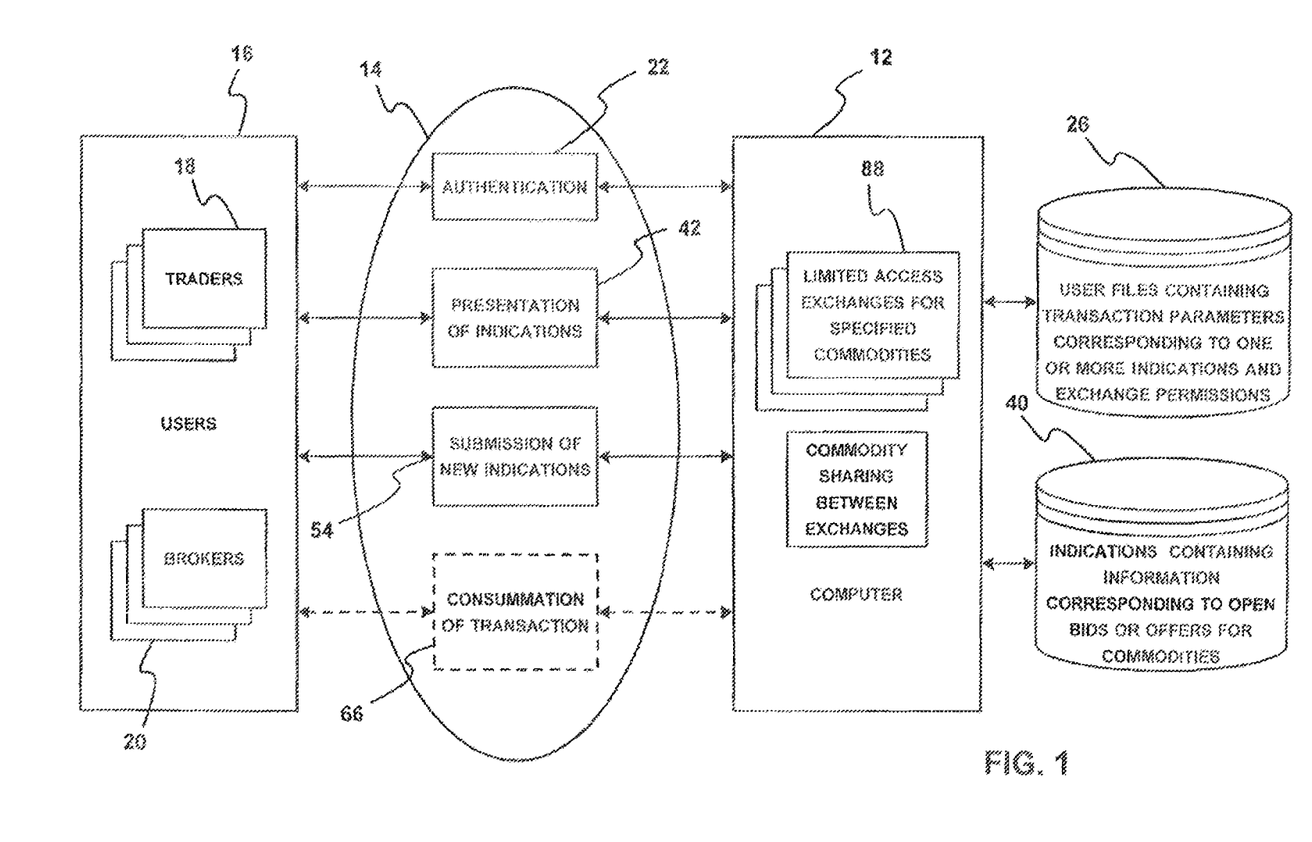
FIG. 1 is a schematic of a system for trading commodities in accordance with the present invention.

FIG. 1 depicts a system 10 for trading commodities in accordance with the invention. The system 10 includes a computer 12 and a communications link 14 between the computer 12 and the users 16 of the system. The computer 12 may be any type of computing device capable of performing the functions described herein. For example, the computer 12 may be a personal computer, minicomputer, mainframe, supercomputer, web server, or any combination thereof. The communications link 14 may take any suitable form that permits communication between the users 16 and the computer 12, such as a direct-dial modem connection or hardwire connection. Preferably, the communications link 13 comprises an appropriate connection between the computer 12 and the Internet and software executing on the computer 12 for operating and maintaining an interactive website for facilitating communication between the computer 12 and users 16. Users 16 of the system 10 will generally include commodity traders 18 seeking to place offers or bids and/or professional commodity brokers 20 seeking to do the same on behalf of their clients.

A user 16 of the system 10 must first be authenticated 22 before he can enter and utilize the system 10. The authentication process 22, shown in FIG. 2, generally includes the submission of authentication data 24 associated with the user 16 that permits the computer 12 to recognize the user 16, such as a username and password. Software executing on the computer 12 may transmit a prompt to the user 16 over the communications link 14 requesting the user's authenticating data. The user then submits 24 his data to the computer 12 over the communications link 14. Upon receipt, software executing on the computer 12 accesses a database 26 containing a plurality of user files to verify 28 the submitted authentication data 24. The user file acts as a depository for all information related, to the user. Once verified, the user 16 has been authenticated 30 and can proceed to use the system 10. Alternately, the system 10 may include cookie technology that permits the computer 12 to immediately identify and recognize the user 16 once the user accesses the system 10 or the system 10 may include software executing on the computer 12 that recognizes the user based on the user's Internet Protocol (IP) address. These alternatives would allow the user 16 to be immediately recognized without having to actively submit any authentication data.

Figure 2:
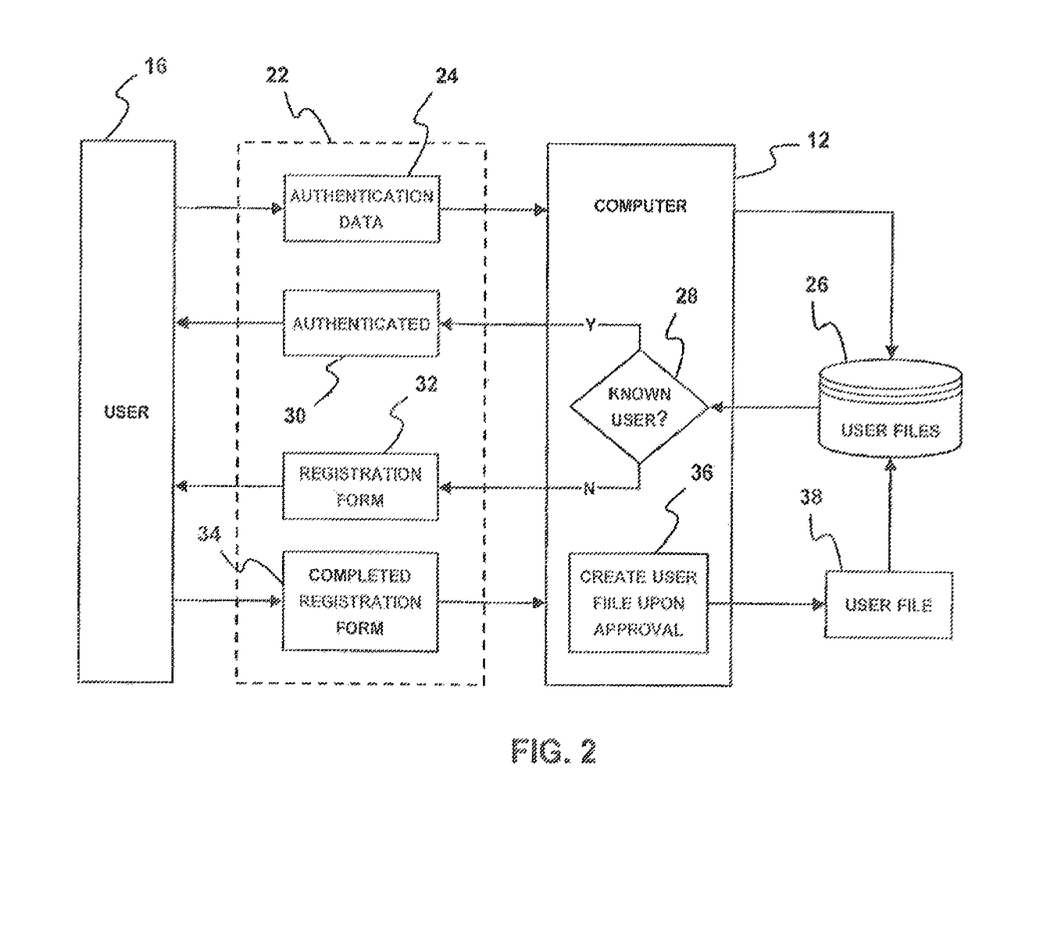
FIG. 2 is a schematic of the authentication process of the system depicted in FIG. 1.

If the user 16 does not have any authentication data 24, he may request to register with the system 10. In such a case, software executing on the computer 12 transmits a registration form 32 to the user 16. The registration form 32 may also be transmitted to a prospective user via other means such as e-mail or postal service. Preferably, though, the registration form 32 is electronic and is received and completed 34 by the user 16 and returned electronically via a website to expedite and simplify the process. The registration form 32 may request any information deemed to be necessary by the administrators of the system 10 to determine whether the user 16 is eligible to perform trades on the system 10 and any preferences the user may have regarding various options described herein. Once the registration form has been submitted 34 and approved, the user 16 is assigned authentication data 24, such as a username and password, and a user file 38 related to the user 16. The user file contains the authentication data 24 and any other information provided by the user in the registration form and is created 36 and stored in the user database 26. It is to be understood that authentication data 24 such as user names and passwords can be chosen by the user 16 as opposed to being assigned by the computer 16.

Once an authenticated user 16 accesses the system 10, software executing on the computer 12 accesses a database 40 containing a plurality of open bids and offers currently available for trading that have been previously submitted by other users 16 of the system 10. Such open offers and bids are generally referred to as indications of interest, or indications for short. Each indication contains relevant information pertaining to the hid or offer such as the type of commodity involved, the amount of commodity available, the price of the commodity, and/or the contact information required, if any, to complete a transaction related to the indication. The software retrieves the indications from the database and presents 42 them to the user 16 over the communications link 14. Generally, the indications are presented to the user 16 as a list or table that permits the user 16 to select any specific bid or offer.

Preferably, each of the user files in the user database 26 contains a plurality of transaction parameters corresponding to one or more indications associated with said user file. These transaction parameters govern the presentation and acceptance of indications associated therewith. The transaction parameters may enable a submitter of an indication to remain anonymous to specific users 16 of the system 10 that have been predetermined by the submitter. For example, the submitter may wish to post his indications anonymously to certain other users for various reasons. The transaction parameters may also permit the submitter of an indication to grant specific users preferred status over other users of the system with respect to actions concerning indications submitted by the submitter. For example, a submitter may have had good relations with particular user and may wish to give them preference over other users of the system such as for credit purposes or otherwise. In essence, the transaction parameters permit the submitter of an indication to control to how the indication is presented and acted upon by other users. Other examples of transaction parameters may include whether the indication is film or not or the desired contact person regarding the indication.

The transaction parameters are predetermined by the user and may be submitted to the computer 12 by a user 16 within a completed indication submission form 58. The transaction parameters may also be determined by the user 16 and submitted to the computer 12 within the completed registration form. Software executing on the computer would retrieve the transaction parameters submitted within the completed indication submission form or completed registration form 32 and store the transaction parameters in a user file corresponding to the user.

Figure 3:
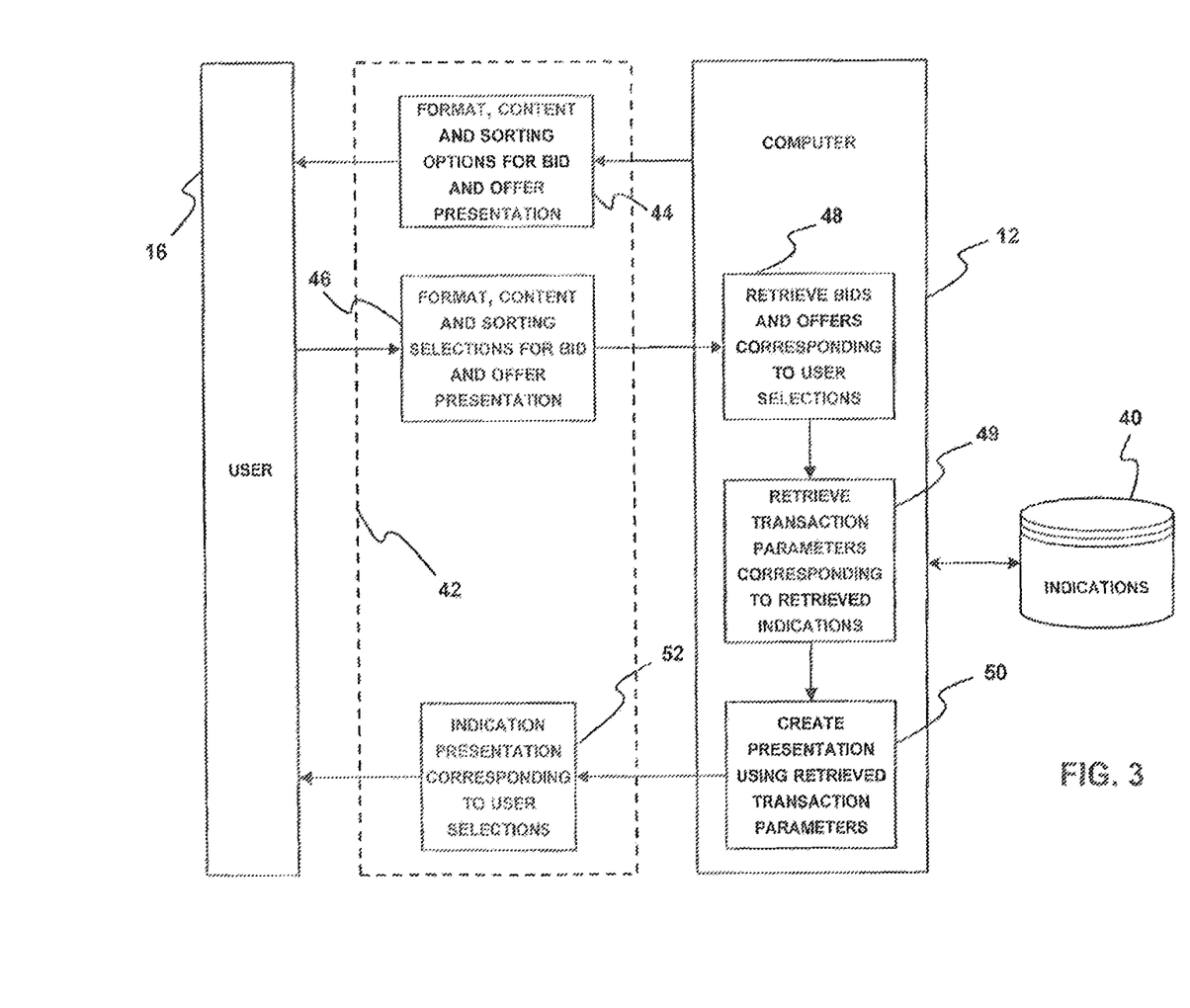
FIG. 3 is a schematic of the indication presentation process of the system depicted in FIG. 1.

Preferably, the presentation 42 of the indications is completely sortable and interactive to permit the user 16 to quickly and easily access any desired indications or information that is available, as shown in FIG. 3. Software executing on the computer 12 may transmit a plurality of format, content, and/or sorting options 44 to the user 16 over the communications link 14. Such format options may include the formal in which the bids and offers are presented to the user 16, such as in tabular or graphical format. Content options may allow a user to retrieve indications for specific bids or offers having certain parameters, such as commodity type, bid versus offer, or other discernible difference ascertainable from any information submitted with the indication. For example, the user may seek only open offers on brent or firm bids from a specific trader or broker. The software may also transmit a plurality of sorting options to the user over the communications link. Such sorting options could include options to sort by date posted, highest/lowest price, quantity available, etc.

It is to be understood that the format, content, and sorting options of the presentation of the indications are closely interrelated and can be presented to the user 16 simultaneously. Upon receipt of the customer selections 46, if any, software executing on the computer 12 queries the indication database 40 to retrieve 48 any indications corresponding to the user selections 46. The software then queries 49 the user files associated with the retrieved indications to determine the transaction parameters related to each indication. The software then creates 50 a presentation of the retrieved indications based on the user's selections 46 and determined transaction parameters. The created presentation is then transmitted and displayed 52 to the user 16 over the communications link 14. Preferably, during the registration process or otherwise, the user submits the user's preferred format, content, and sorting options to the system and the preferred options are stored in the user's user file. As such, the user may be presented with a display corresponding to their preferred options whenever the user accesses the system. For example, the user may primarily trade in three types of commodities and only desire to see the five indications in each commodity having the lowest offer price. The user would still be able to modify the presentation upon accessing the system and could modify the preferred options from time to time as needed or desired.

In practice, the user 16 may be presented with a menu permitting the user 16 to select which commodities for which he would like to view indications and in what order the display would be organized. For example, the user 16 may wish to be presented with a table displaying the currently open offers on crude brent arranged according to number of barrels available. Additionally, the user 16 may search for a particular offer matching specific parameters, such as bids on Brent for a specified price, submitted by the user 16 to the computer 12 over the communications link 14. Preferably, the system 10 farther includes software executing on the computer 12 for refreshing and updating the user's presentation 52 of indications to reflect new bids and offers as other users of the system submit them. Therefore, the user 16 can be apprised on a real-time basis of the current bids and offers available for trading within the system 10.

Regardless of the format or style of the presentation 52 of indications chosen by the user, it is important that the user 16 be presented with sufficient information to make a determination as to whether or not the user 16 would like to pursue the hid or offer further. As such, initial displays 52 may only present a limited summary of the bid or offer in order to conserve space and facilitate quicker perusal of larger number of bids and offers. The user 16 may then request more detailed information regarding specific bids and offers, if desired.

Figure 4:
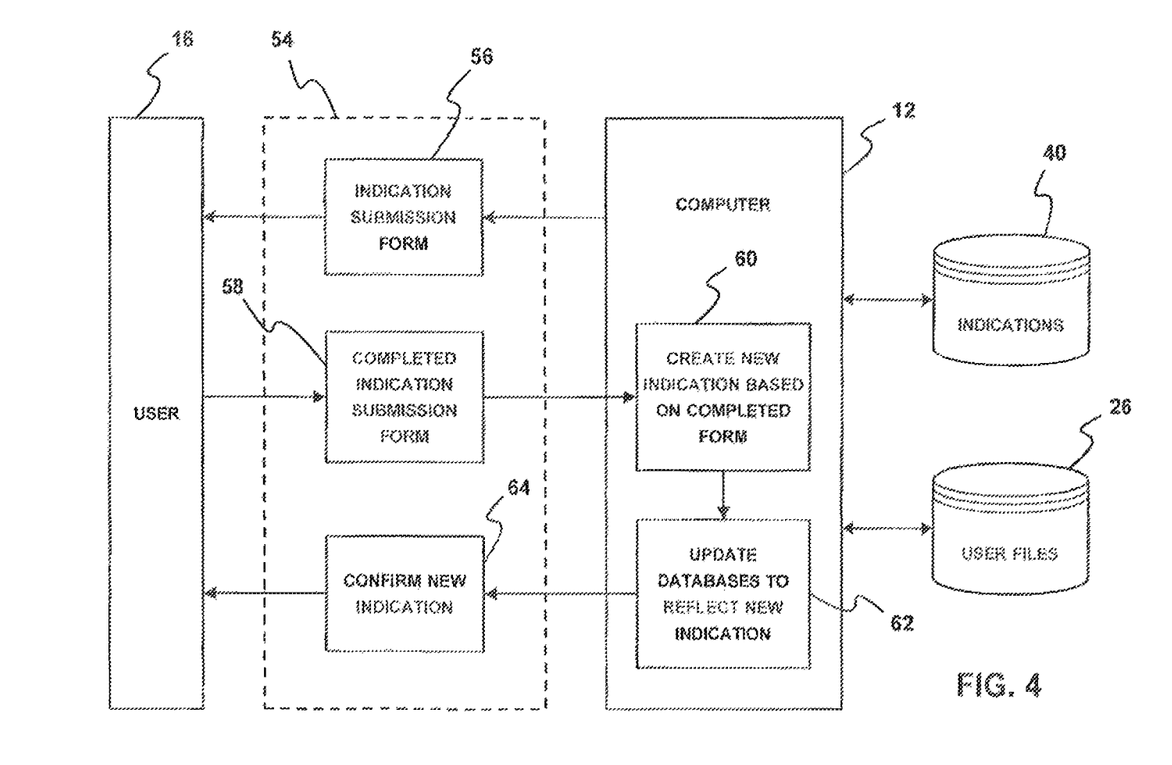
FIG. 4 is a schematic of the indication submission process of the system depicted in FIG. 1.

As shown in FIG. 4, in order to submit 54 a bid or offer to the system 10, the user 16 must complete and submit an indication submission form 56. Software executing on the computer may transmit the submission form 56 to the user 16 over the communications link 14. Alternately, the submission form 56 may be incorporated into the indication presentation 52 to permit the user 16 to quickly view the existing market depth and submit a bid or offer. The submission form 56 requests all necessary information for permitting a trade to be accomplished, for example the commodity type, number of units, cash price, term of open bid or offer, delivery month, contact information, if applicable, etc. Upon receipt of a completed submission form 58, software executing on the computer 12 creates 60 a new indication based on the information provided by the user 16 in the completed registration form 58 and stores 62 the new indication in the indication database 40. Preferably, the software also updates the user's associated user file 38 in the user database 26 to reflect the submitted indication. This readily permits the user 16 to access all the indications he has submitted. Once stored in the indication database 40, the new indication may be accessed and presented to all current and subsequent users of the system 10 for their perusal and action. Additionally, software executing on the computer may permit the users to withdraw or cancel a bid or offer if such a bid or offer were not firm or had not been accepted as of the time of withdrawal.

Figure 5:
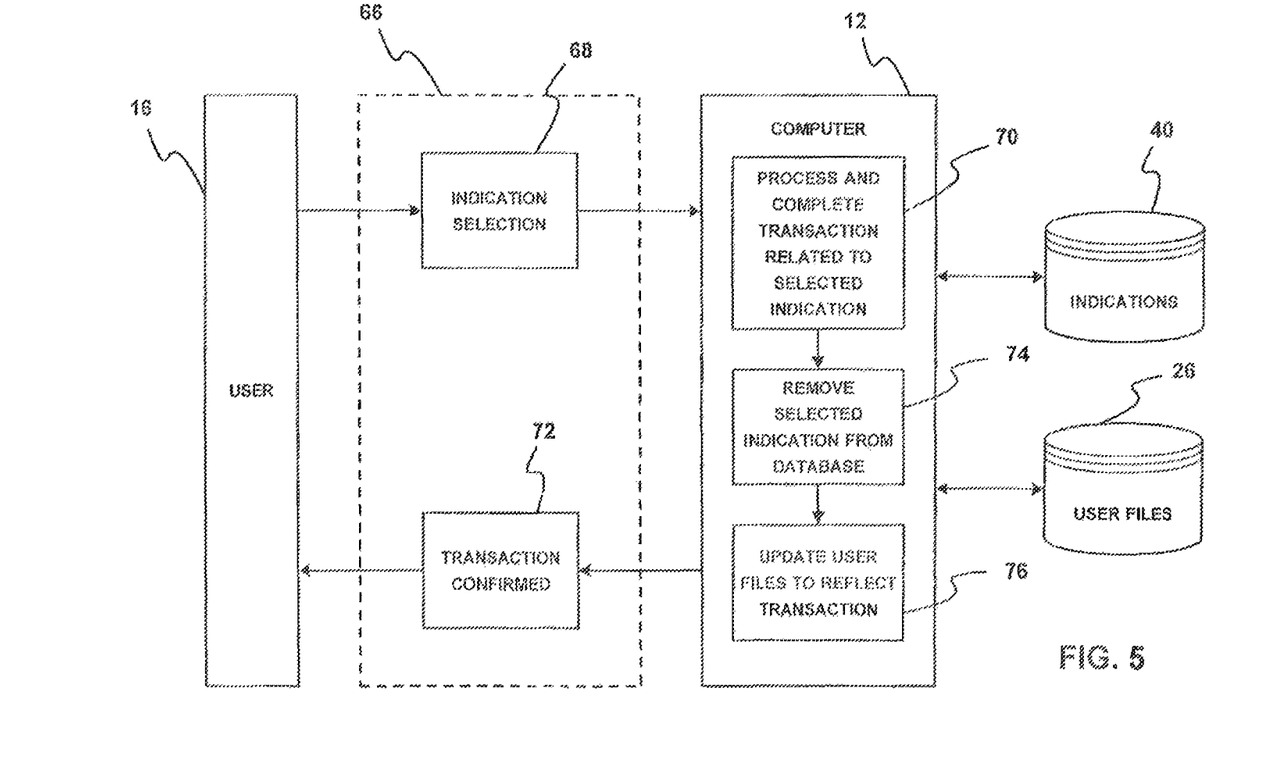
FIG. 5 is a schematic of an embodiment of the consummation of transaction process of the system depicted in FIG. 1.

The process for completing 66 a trade or transaction depends on the capabilities of the specific system and the type of indications being presented to the user 16, namely whether the system 10 processes firm or non-firm bids and offers. If the system is 10 capable and certified to process and transact firm offers, the consummation of the transaction can be accomplished very easily, as shown in FIG. 5. Once the user 16 finds an indication that he desires to accept, the user may select the indication from the presentation 52 and submit 68 the selection to the computer 12 over the communications link 14. Software executing on the computer 12 would receive the indication selection and process and complete 70 the transaction appropriately and in accordance with any transaction parameters that may be associated with the selected indication 68. Once completed, the user 16 and the submitter of the selected indication may be transmitted 72 a confirmation that the transaction was successful over the communications link 14 by the software. The software may also remove 74 the selected bid or offer from the indication database 40 and update 76 the appropriate user files 38 in the user databases 26 to reflect the transaction. Thus, through a simple process, such as a point and click operation on a website the user may complete a transaction when the system 10 includes firm bids and offers.

In practice, a submitter would enter a firm hid to buy, or firm offer to sell commodities or derivatives at a specific price for a particular delivery date, both of which were designated by the submitter in the respective completed indication submission form. If the user 16 desires to accept a firm offer or bid, then the user need only click on the desired firm indication using a mouse or keyboard or other appropriate input device, at which point the transaction would be considered final and binding between the user and the submitter. The system 10 then would automatically generate a trade confirmation and transmit it to both parties to the trade over the communications link.

Figure 6:
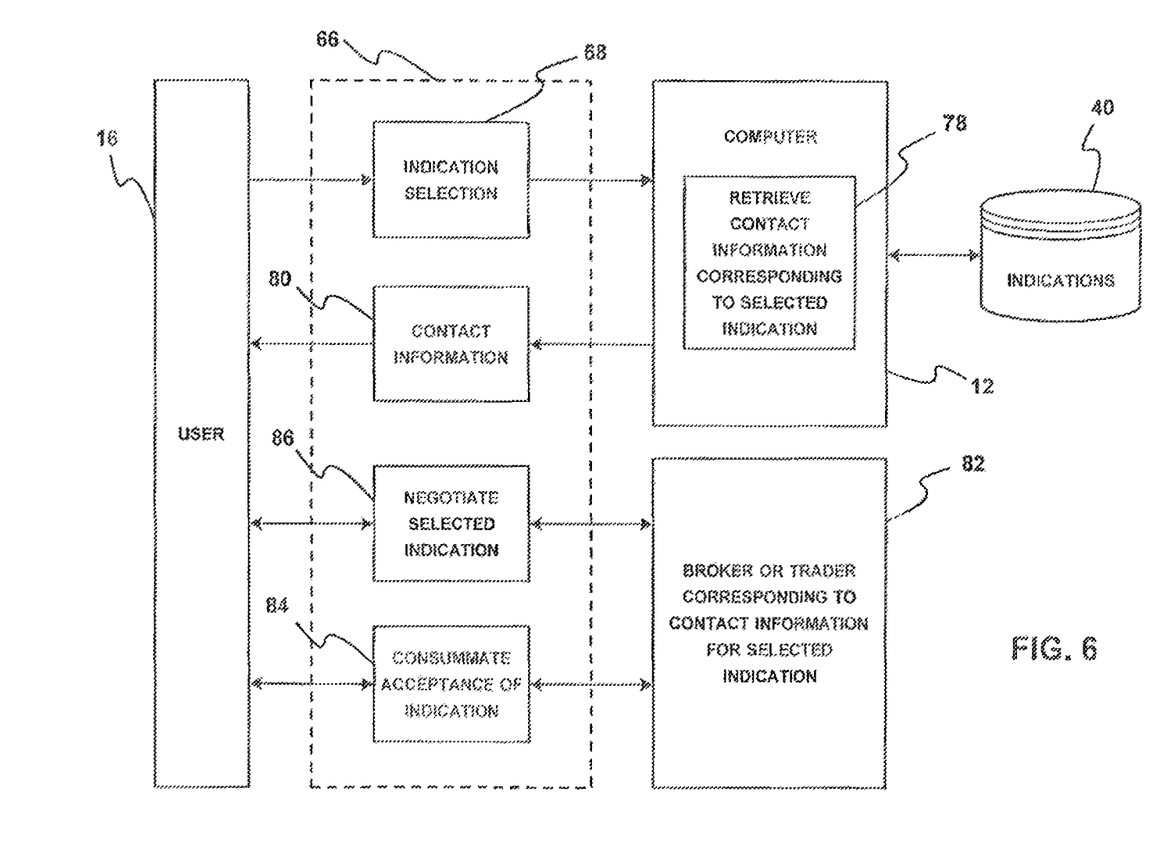
FIG. 6 is a schematic of another embodiment of the consummation of transaction process of the system depicted in FIG. 1.

In the instance where non-firm bids and offers are presented to the user 16 by the system 10, as shown in FIG. 6, the consummation process is more interactive and involved. As before, the user 16 selects and submits 68 the indication desired to be accepted to the computer 12 over the communications link 14. Software executing on the computer 12 receives the user selection 68 and retrieves 78 contact information corresponding to the selected bid or offer 68 from the bid and offer database 40. The contact information 80 identifies a person 82, generally another broker or trader, to be contacted regarding the selected indication who has the authority and capability to complete the transaction. The contact information 80 also contains appropriate information on how to communicate with the person 82, such as a phone number or email address. The submitter of the indication may provide the contact information 80 of the desired contact person 82 during the bid or offer submission process 54, for example within the indication submission form 56. Alternatively, the appropriate contact information 80 may be obtained during the authentication process 22, included in the user file, and added automatically to the bid or offer when a user 16 makes a submission.

The retrieved contact information 80 is then transmitted to the user 16 over the communications link 14. Upon receipt, the user 16 contacts the person 82 accordingly depending on the content of the contact Information 80 to complete 84 the transaction. The system 10 may provide for some flexibility of the indications submitted permitting the user and the contact person to negotiate 86 various aspects of the bid or offer prior to consummating the trade. As can be seen, in instances of transactions involving non-firm bids and offers, the user 16 must contact a third party apart from the computer 12, such as by phone or otherwise to complete the deal. However, the system could be readily modified to include software executing on the computer 12 for providing users 16 of the system 10 as computerized means for real time communication, such as a dedicated secure chat room, in which the various parties to the transaction may directly communicate to negotiate or otherwise complete the transaction. Nonetheless, the consummation of non-firm indications may be completed off-line from the computer 12. This aspect is indicated in FIG. 1 by the dashed lines.

In practice, a submitter, whether it be a trader or broker, would submit to the computer 12 an indication at a specific price for as particular delivery or settlement date, both of which are designated by the submitter in the respective completed bid or offer submission form. If the use sees the submitter's bid or offer, he may select it if he is interested in negotiating a transaction based upon that indication. Once the user clicks on the bid or offer, the computer transmits the contact information for the submitter to the user over the communication link. For example, the computer would transmit the name of a broker and how to contact him. The user may then, independent of the system or otherwise, contact the submitter and attempt to negotiate a firm and binding agreement based upon the original terms presented by non-firm bid or offer submitted.

Indications submitted by brokers may show the name of the broker and how to contact him and often the underlying client on whose behalf the broker is working. However, depending on the transaction parameters selected by the broker, he may elect to submit all bids and offers anonymously for his client, i.e. that a client's name or other identification information not be provided with any bids or offers submitted to the system 10. Alternatively, the user 16 may permit the broker to submit indications under the user's name. Thus, the broker may submit a bid for a commodity and the indication could be shown under the user contact information and according the user's desired transaction parameters. It is to be understood that any other user of the system 10 designated by the user 16 may be utilized by this feature and the other user need not be a broker. The feature may also be integrated as a transaction parameter. The broker may also provide a list of traders and brokers having a preferred status with his client as part of the transaction parameters. Traders and brokers with the preferred status would be able to identify the client 10 as the submitter of the indication and/or have other benefits regarding action on the indication.

Figure 7:
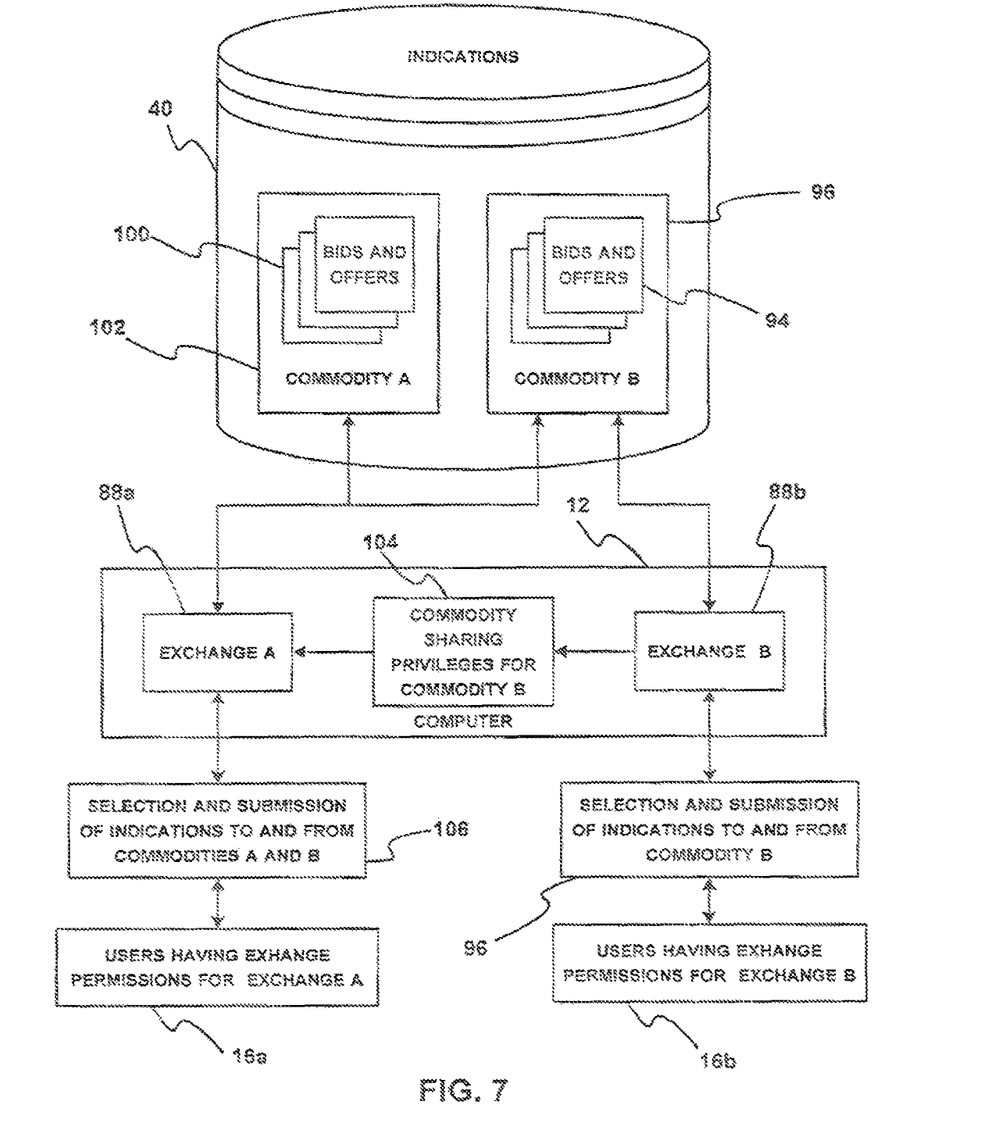
FIG. 7 is a schematic of the exchange and commodity-sharing features of the system depicted in FIG. 1.

The system 10 may also collect information regarding each transaction performed by the user 16. Software executing on the computer 12 would track all submission, actions, and trades performed by the user 16 and store the collected information in the user's user file 38 in the user database 26. Thus, a user may access and view his personal trading history. The trading history could be sortable and searchable to permit the user 16 to access and display any desired or specific types of trades performed. For example, the user 16 may wish to view all completed trades for a specific time period or cancelled trades for a specific commodity or his position in a particular commodity. This feature may be extended to permit an administrator to monitor and track transactions of a specific group of traders. In such an instance, the administrator would be granted permission by the system 10 to access and view the user files 38 of specified users. For example, a brokerage firm may have twelve traders working for it using the system 10. This feature would allow the manager to monitor and review the transactions and performance of each of the twelve traders or view the firm's position in various markets. Software executing on the computer could permit the administrator to sort and view the desired information in any selected format, similar to the options provided in the presentation process 42. The system may further include software executing on the computer 12 for operating and maintaining a plurality of different exchanges 88, as shown in FIG. 7. The exchanges 88 permit the transaction of predetermined commodities and are accessible by only selected users 16 having proper exchange permissions corresponding to each exchange. Indications involving the commodities associated with an exchange are solely accessible by users 16 who have access to the exchange. Likewise, any indications submitted by users 16 having access to the exchange 88 would be stored in the database under the commodity associated with the exchange. Accordingly, indications within the indication database 40 may be organized according to the commodity to which the indication relates to facilitate and expedite access to the indication by the exchanges 88 and ultimately, the users 16. The exchanges 88 may be created by the system administrators or any other entity desiring to create an exchange. The party that creates the exchange may also decide and/or create the commodities associated with the exchange 88. Preferably, all the exchanges 88 utilize and retrieve information from a common indication database that is shared by all of the exchanges in the system 10.

The exchange feature is shown by way of example in FIG. 7. Exchange B 88b is associated with Commodity B 94 in the indication database 40. Users 16b having exchange permissions for Exchange B 88b may view and select 96 bids and offers 98 from indications stored under Commodity B 94 in the indication database 40. Any indication submissions submitted by the users 16b would be stored in the indication database 40 under Commodity B 94. However, as can be seen, users 16b having access to Exchange B may not view or transact any indications that may be stored in any other commodities in the indication database 40, such as the bids and oilers 100 stored in Commodity A 102.

In many instances, it may be desirable to grant commodity-sharing privileges 104 to other exchanges to improve the liquidity of transaction of commodities between various exchanges 88 and users 16. Such privileges would permit multiple exchanges to transact indications within a single commodity in the indication database 40. As shown in FIG. 7, Exchange A 88a is associated with Commodity A 102. If Exchange B grants commodity-sharing privileges 104 to Exchange A 88a, users 16a having exchange privileges for Exchange A 88a may now view and transact 106 any bids and offers 96 in Commodity B 94 in addition to any indications 100 within Commodity A 102. However, when users 16a of Exchange A submit indications relating to Commodity A 102, the indication would be stored under Commodity A 102 in the database. Such commodity-sharing privileges are generally agreed to between the various creators of the exchanges 88. It is to be understood that any number of exchanges 88 may agree to grant commodity-sharing privileges 104 between them for any number of commodities. While FIG. 7 illustrates a unilateral commodity-sharing privilege, it is to be understood that such commodity-sharing privileges may also be bilateral permitting both exchanges to view and transact indication within the other's related commodities.

The exchanges 88 may be accessed through the authentication process 30 to permit the user to directly access any exchanges 31 to which the user 16 may have access. Software executing on the computer 12 would query the users user file to verify proper exchange permissions. Additionally, the registration form may permit the user 16 to select which exchanges he would like to have access. The system may grant permissions directly to the user 16 if the desired guidelines have provided to the system administrators by the exchange creator or the request may be appropriately forwarded to the creator for independent decision. It is to be understood that users 16 may directly contact an exchange creator and seek permissions and the creator may contact the system administrators to grant the exchange permissions. Regardless, if a user is granted access to an exchange, the exchange permissions are preferably stored in the user's user file 38 in the user database 26.

If the instance of exchanges 88, when presenting 42 indications to the users 16 of an exchange, software executing on the computer 12 may query the user database 26 to retrieve and/or verify the exchange permissions from a user file 38 corresponding to the user 16 and retrieve indications from the indication database 40 corresponding to the predetermined commodities within the exchanges to which the user has been determined to have access. The software may then generate a presentation 52 of the retrieved indications and transmit the presentation to the user 16 over said communications link 14.

The system may further include software executing on the computer for tracking and storing information corresponding to all the transactions that are completed on the system. Such information may include the commodity, the number units, the unit price at which the commodity, for example. Such tracked information may then be downloaded or otherwise transferred to any desired third party database or system for further processing or use.

The previous description and figures encompasses specific embodiments of the present invention. More specifically, the description and figures refer to the trading of commodities. While the description refers only to commodity trading, it is to be understood that the system is applicable to all types of trading of tangibles and/or intangibles, including, but not limited to, trading of products, things, services, stocks, securities, futures and bonds.

Although the invention has been described with reference to a particular arrangement of parts, features, and the like, these are not intended to exhaust all possible arrangements or features, and indeed many other modifications and variations will be ascertainable to those of skill in the art.

The invention claimed is:

1. A system comprising:
   a computer;
   a communications link between the computer and the Internet;
   an indication database, accessible by the computer, containing a plurality of indications associated with one or more users, the plurality of indications containing information corresponding to open bids or offers for commodities;
   a user database, accessible by the computer, containing a plurality of user files associated with the one or more users; and
   software on the computer that, when executed, causes the computer to:
   operate and maintain an interactive website that is simultaneously accessible by at least a first user device and a second user device, the first user device associated with a first user, the second user device associated with a second user, receive an input to the interactive website from the first user device over the communications link, the input comprising a selection of a category of one or more indications, search the indication database and retrieve an indication of the one or more indications, identify that the indication is associated with the second user, access, from the user database, a first user file associated with the first user and a second user file associated with the second user, create a presentation associated with the indication to be displayed on the first user device, wherein a content of the presentation is in accordance with both first display preferences associated with the first user and stored in the first user file and second display preferences associated with the second user and stored in the second user file, automatically modify the presentation to conserve display space on a display of the first user device, said modified presentation comprising a limited summary of the content to enable quicker perusal of the one or more indications, display, on the first user device, the modified presentation, and generate, within the interactive website, a dedicated and secure communications window that enables both the first user and the second user to communicate privately and complete a transaction involving the indication.

2. The system of claim 1, wherein the second display preferences govern whether an identity of the second user remains anonymous to the first user.

3. The system of claim 1, wherein the second display preferences govern whether contact information of the second user is revealed to the first user.

4. The system of claim 1, wherein the second user file includes one or more user options that enable the second user to grant specific users of the system preferred status over other users of the system with respect to actions concerning indications submitted by the second user.

5. The system of claim 1, wherein the second user file includes one or more user options that enable the second user to submit at least one indication on behalf of and under a name of another user of the system when the another user has previously designated the second user as having permission to perform such action.

6. The system of claim 1,
wherein the software on the computer, when executed, further causes the computer to:
transmit an incomplete indication submission form to the second user over the communications link,
receive a completed indication submission form submitted by the second user,
create the indication based on the completed indication submission form,
associate the indication with the second user file, and
store the indication in the indication database.

7. The system of claim 6, wherein the completed indication submission form comprises the second display preferences.

8. The system of claim 1, wherein the software on the computer, when executed, further causes the computer to:
receive a request to register from the second user over the communications link,
transmit a registration form to the second user over the communications link in response to the request,
receive a completed registration form submitted by the second user over the communications link,
create the second user file based on the completed registration form, and
store the second user file in the user database.

9. The system of claim 1, wherein the software on the computer, when executed, further causes the computer to:
receive further input to the interactive website from the first user over the communications link, the further input comprising an acceptance of the indication, and
automatically consummate a transaction between the first user and the second user.

10. The system of claim 9, wherein the software on the computer that, when executed, further causes the computer to:
retrieve information from the indication database corresponding to the indication that is necessary to consummate the transaction.

11. The system of claim 1, wherein the software on the computer, when executed, further causes the computer to:
receive further input to the interactive website from the first user over the communications link, the further input comprising an acceptance of a non-firm indication chosen by the first user from among the open bids and the offers.

12. The system of claim 11, wherein the second user file includes contact information of the second user, and the software on the computer, when executed, further causes the computer to:
retrieve the contact information from the second user file associated with the second user, and
transmit the retrieved contact information to the first user over the communications link.

13. The system of claim 12, wherein the contact information further includes a request to initiate a communication between the first user and the second user to finalize the acceptance.

14. The system of claim 13, wherein the communication comprises a negotiation between the first user and the second user regarding the non-firm indication.

15. The system of claim 14, wherein the interactive website comprises an interactive communication environment simultaneously accessible by both the first user and the second user over the communications link.

16. The system of claim 1, wherein the interactive website facilitates live interactions between the first user and the second user.

17. The system of claim 1, wherein the software on the computer, when executed, further causes the computer to:
track actions performed by the second user and store the tracked actions in the second user file.

18. The system of claim 17, wherein the software on the computer, when executed, further causes the computer to:
receive a trading history request from the first user over the communications link,
query the user database to retrieve the tracked actions from the second user file,
compile a trading history based on the tracked actions, and
transmit the trading history to the first user over the communications link.

19. The system of claim 1, wherein each of the plurality of user files contain authentication data unique to an associated user, and the software on the computer, when executed, further causes the computer to:

receive authentication data submitted by the associated user over the communications link, and query the user database to verify the submitted authentication data.

20. The system of claim 1, wherein the software on the computer, when executed, further causes the computer to:
    automatically refresh and update the modified presentation, in real time, to include bids and offers as other users submit them to the system.

21. The system of claim 1, wherein the software on the computer, when executed, further causes the computer to:
    automatically update the first user file and the second user file to reflect the transaction.

* * * * *